United States Patent [19]

Putz et al.

[11] Patent Number: 5,210,824
[45] Date of Patent: May 11, 1993

[54] ENCODING-FORMAT-DESENSITIZED METHODS AND MEANS FOR INTERCHANGING ELECTRONIC DOCUMENT AS APPEARANCES

[75] Inventors: Steven B. Putz, Cupertino; Mark D. Weiser, Palo Alto; Alan J. Demers, Woodside; A. Lawrence Spitz, Palo Alto, all of Calif.

[73] Assignee: Xerox Corporation, Stamford, Conn.

[21] Appl. No.: 680,592

[22] Filed: Mar. 28, 1991

Related U.S. Application Data

[63] Continuation of Ser. No. 318,587, Mar. 3, 1989, abandoned.

[51] Int. Cl.$^5$ .............................................. G06F 15/20
[52] U.S. Cl. ..................................................... 395/145
[58] Field of Search ............... 364/518, 521, 523, 200, 364/900; 395/145, 148, 500, 600

[56] References Cited

U.S. PATENT DOCUMENTS

| | | | |
|---|---|---|---|
| 4,604,710 | 8/1986 | Amezcua et al. | 364/900 |
| 4,754,428 | 6/1988 | Schultz et al. | 364/900 |
| 4,849,883 | 7/1989 | Mitchell et al. | 364/300 |
| 4,858,114 | 8/1989 | Heath et al. | 364/200 |

OTHER PUBLICATIONS

Xerox Corporation, *Courier: The Remote Procedure Call Protocol*, Dec. 1981.

*Primary Examiner*—Heather R. Herndon

[57] ABSTRACT

A database system is provided for interchanging visually faithful renderings of fully formatted electronic documents among computers having different hardware configurations and different software operating environments for representing such documents by different encoding formats and for transferring such documents utilizing different file transfer protocols. All format conversions and other activities that are involved in transferring such documents among such computers essentially are transparent to their users and require no a priori knowledge on the part of any of the users with respect to the computing and/or network environments of any of the other users. All database operations are initiated and have their progress checked by means of a remote procedure call protocol which enables client applications to obtain partial results from them relatively quickly, without having to wait for such operations to complete their work. These database operations are forked as child processes by a main database server program, so the functionally of the database system may be extended easily by adding further database operation programs to it.

6 Claims, 15 Drawing Sheets

FIG. 10

ENCODING-FORMAT-DESENSITIZED METHODS AND MEANS FOR INTERCHANGING ELECTRONIC DOCUMENT AS APPEARANCES

This is a continuation of application Ser. No. 07/318,587, filed Mar. 3, 1989 now abandoned.

FIELD OF THE INVENTION

This invention relates to document databases for distributed computer systems and, more particularly, to methods and means for providing users of personal computers and professional workstations (collectively referred to herein as "workstations") shared access to electronic documents, despite differences in the hardware configurations and the software operating environments of their workstations, the encoding formats of their electronic documents, and the file transfer and communication protocols of their network environments.

BACKGROUND OF THE INVENTION

Various text and synthetic image editors have been developed for creating and editing documents on computers having different hardware configurations and different software operating environments. Unfortunately, many of these editors utilize different document description languages (DDL's) for encoding the structure and content of such documents in formats that enable them to be manipulated and rendered by certain computer systems, but not by others. For example, WYSIWYG ("What You See is What You Get") text editors generally are based on DDL's having system specific encoding formats.

As a result of these diverse document encoding formats there is a "document interchange problem" that interferes with the sharing of electronic documents by users employing different computer hardware configurations and/or different software operating environments. Users sometimes can work around this problem by using plain text encoding, such as standard ASCII encoding, for the documents they want to share or by running documents having a foreign encoding format through a format converter. However, plain text encoding sacrifices much of the formatting information that is required to give an electronic document the appearance intended by its author. Format conversion programs, on the other hand, not only are limited by the operating system of the host computer upon which they reside, but also usually require that the host have substantial computational resources available for running them. Furthermore, known format converters generally require a priori knowledge of both the original and the desired format of the document, so they are merely a partial solution to the problem.

Image databases, such a Filenet, combine some of the elements of document appearances and document descriptions. These databases are designed for the storage and retrieval of images, but the stored images or "appearances" are retrievable in just one predetermined format. For that reason, clients often need custom displays and/or extensive custom software for rendering the images they retrieve from such a database. These databases typically contain separate queriable information about each of the stored images, but this descriptive information conventionally is confined to a few predetermined fields, rather than providing an open-ended image description that can be supplemented to tailor it to the user's requirements. Furthermore, the standard practice is to store all image descriptions at the same level of such a database, so one description cannot point to another.

Extended remote procedure call (RPC) operations are used to carry out this invention. Accordingly, it is to be understood that there are known extended RPC operations for providing server callbacks to the client when a procedure called by the client reaches completion, as well as extended RPC operations which require periodic callbacks from the client (i.e., server polling by the client) while the called procedure is being performed. However, the server callbacks of these known RPC operations do not give the client partial results. Moreover, the known client polling techniques do not take changes in the status of the server into account after the called procedure has been initiated.

SUMMARY OF THE INVENTION

In accordance with the present invention, a database system is provided for interchanging visually faithful renderings of fully formatted electronic documents among computers having different hardware configurations and different software operating environments for representing such documents by different encoding formats and for transferring such documents utilizing different file transfer protocols. All format conversions and other activities that are involved in transferring such documents among such computers essentially are transparent to their users and require no a priori knowledge on the part of any of the users with respect to the computing and/or network environments of any of the other users.

In keeping with a more detailed feature of this invention, all database operations are initiated and have their progress checked by means of a remote procedure call protocol which enables client applications to obtain partial results from them relatively quickly, without having to wait for such operations to complete their work. These database operations are forked as child processes by a main database server program, so the functionally of the database system may be extended easily by adding further database operation programs to it.

BRIEF DESCRIPTION OF THE DRAWINGS

Additional objects and advantages of this invention will become apparent when the following detailed description is read in conjunction with the attached drawings, in which:

FIG. 10 illustrates a user interface tool for scanning documents, recognizing their text entering them and their descriptions into a database in accordance with this invention;

DETAILED DESCRIPTION OF AN ILLUSTRATED EMBODIMENT

While the invention is described in some detail hereinbelow with specific reference to an illustrated embodiment, it is to be understood that there is no intent to limit it to that embodiment. On the contrary, the aim is to cover all modifications, alternatives and equivalents falling within the spirit and scope of the invention as defined by the appended claims.

I. FUNCTIONAL OVERVIEW

A. Electronic Documents as Appearances Plus Descriptions

In accordance with the present invention, electronic documents are divided into two parts; an "appearance" and a "description" which are stored, manipulated and retrieved separately. A document description contains all of the symbolic information about the document to which it pertains. Thus, such descriptions are the primary source of information for searches formulated using ordinary database queries (excluding holistic pattern matching on appearance contents). A document appearance, on the other hand, contains all of the psychophysically significant information that is essential to a human viewer's perception of the document to which it pertains. Neither an appearance nor a description is sufficient to specify any given electronic document, but they combine to specify it fully. Appearances and descriptions are linked to each other because each description always contains the unique identifier or "handle" of the appearance to which it pertains. However, some descriptions may pertain to multiple appearances, such as pages of a document or chapters of a book, so they can contain multiple handles. Descriptions also may relate to descriptions (as opposed to appearances) in which case they would contain the handles of the descriptions to which they pertain.

B. Storing and Retrieving Documents

All appearances are fixed, but their representations or "renderings" are variable and can be tailored to the individual viewer's personal needs. Thus, document appearances can be entered into the database system of the present invention from any "client" workstation or input server, such as a server for an input scanner, without altering their encoding formats. Similarly, any client computer display screen or electronic printer server can access any of the stored appearances and render that appearance in a client specified format.

Figure 1:
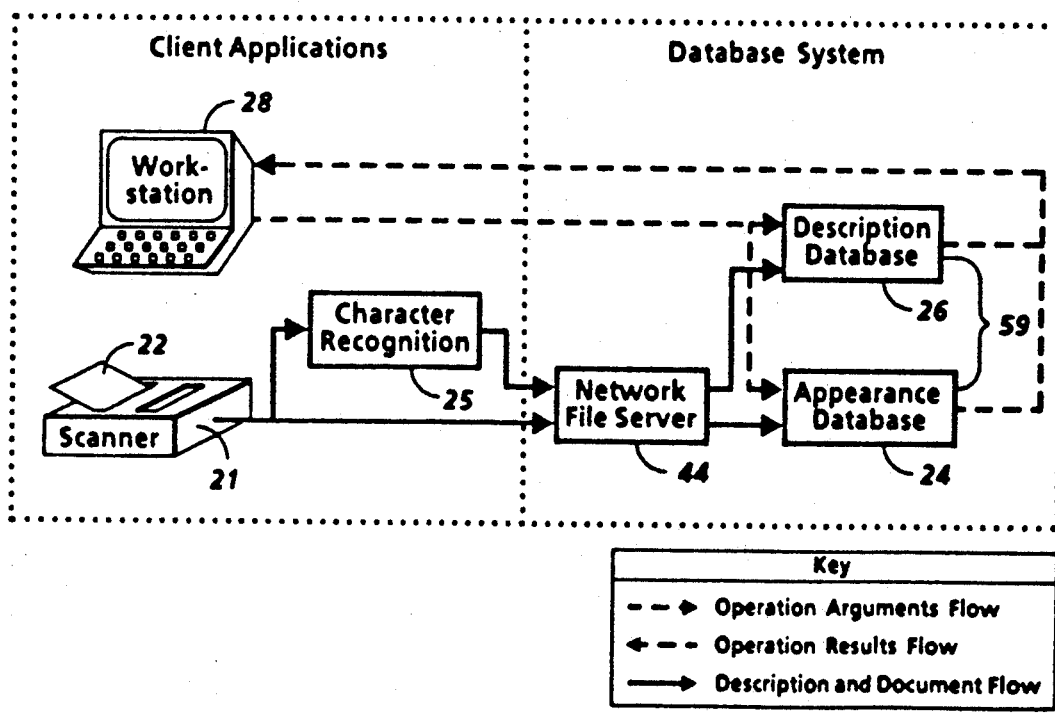
FIG. 1 is a functional block diagram showing the storage of documents as appearances and descriptions in accordance with one aspect of this invention with document and description data flow being shown in solid lines, operation arguments flow being shown in dashed lines terminated by right-hand arrows, and results data flow being shown in dashed lines terminated by left-hand arrows.

For example, as shown in FIG. 1, a more or less conventional input scanner 21 can be employed for converting a paper document 22 into a corresponding electronic bitmap that is encoded in accordance with an uncompressed or a compressed array of intensity samples format. This bitmap is stored as an appearance in one or more appearance database 24. Additionally, it is processed using standard character recognition techniques, as at 25, to generate a description including an ASCII text encoding of the unique name or handle that is assigned to the stored appearance, as more fully described hereinbelow. As will be seen, such a document description typically is augmented by supplemental information that is added to it, either automatically by the database system and/or under the control of the client. The description, in turn, is stored in one or more description databases 26. A similar, but more direct, procedure is employed for entering the appearances and descriptions of the electronic documents created on a client workstation 28 into the appearance and description databases 24 and 26, respectively.

Figure 2:
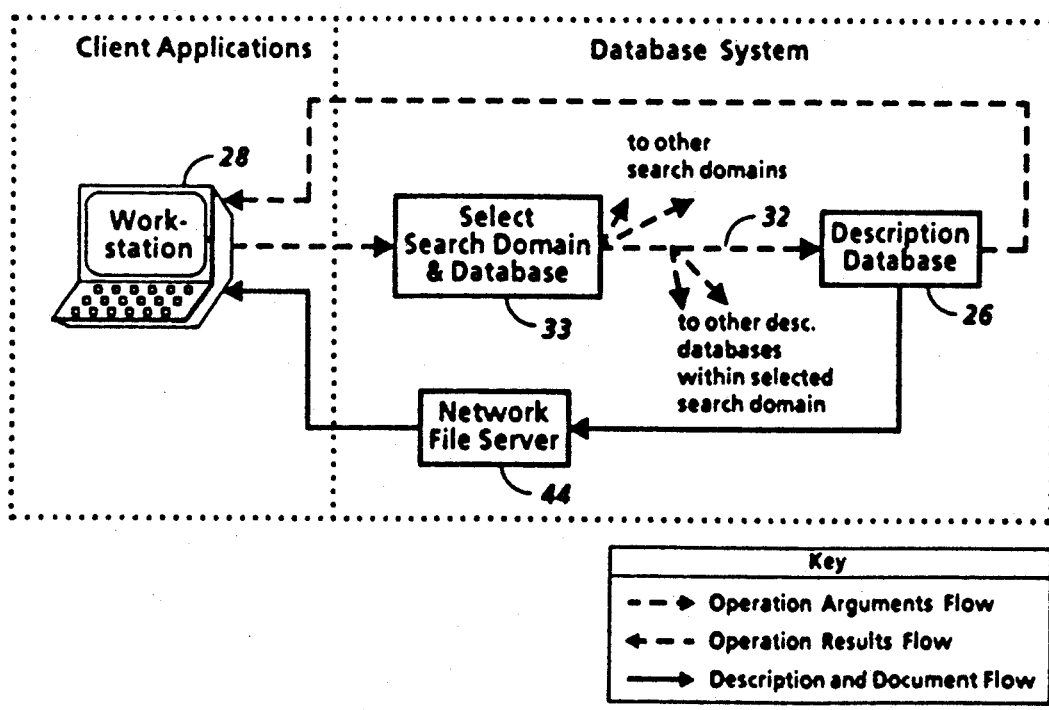
FIG. 2 is a functional block diagram which utilizes the same line types as FIG. 1 for illustrating a description database search in keeping with another aspect of this invention.

Referring to FIG. 2, it will be seen that a user at the client workstation 28 can run a straightforward database query tool to search one or more of the description databases 26 for matches to database-specific queries, as at 32. Suitable routing techniques may be employed, as at 33, for routing these queries to selected description databases 26. Descriptions which match the queries 32 are returned to the client 28 to provide the user with a list of query matching descriptions.

Figure 3:
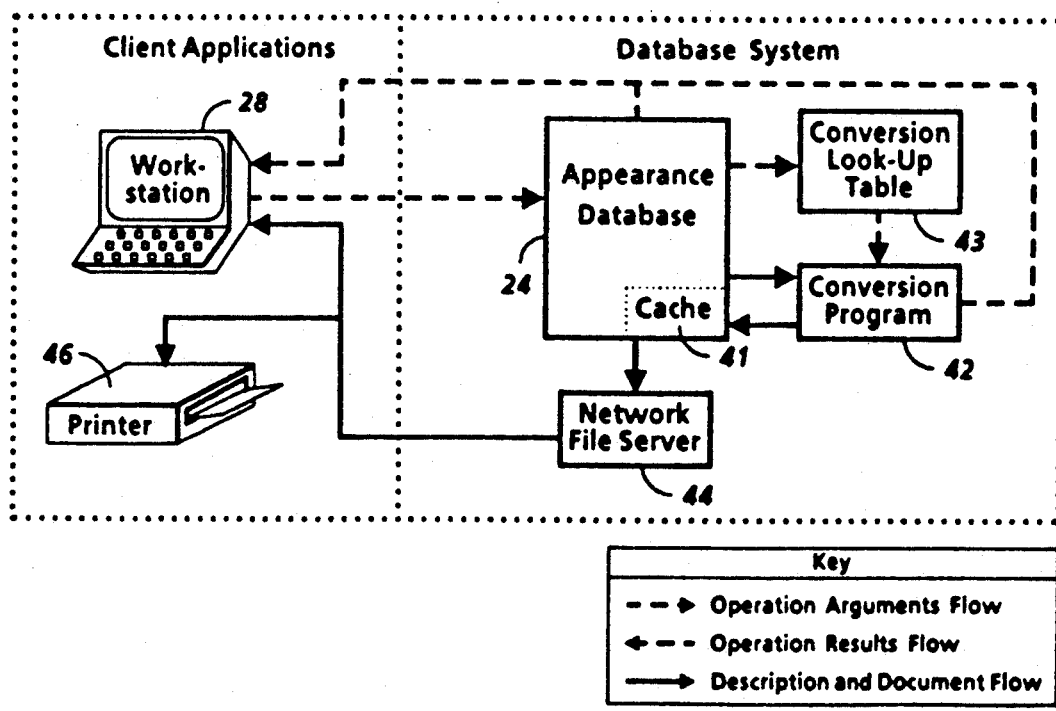
FIG. 3 is a functional block diagram which again utilizes the same line types as FIG. 1 for illustrating the rendering of a document appearance in keeping with still another aspect of this invention.

Turning now to FIG. 3, the user of the client workstation 28 accesses an appearance by furnishing its handle to one or more of the appearance databases 24 and by supplying a rendering specification defining the device upon which the appearance is to be rendered and the data encoding format in which the appearance is to be delivered to the rendering device. The handle for the selected appearance may be obtained from a search query matching description, as described above, or it may be a handle that the user has saved or acquired without having to resort to such a search. Typically, the rendering specification defines the device upon which the appearance is to be rendered in terms of its resolution, the width and height of the desired rendering, and the grey-scale and color characteristics of the rendering device. It may also include other information about the environmental conditions that can affect the perception of the appearance to the human-eye, such as the ambient lighting conditions in the case of an appearance that is to be rendered on a computer display. As a general rule, such a rendering specification calls for a data encoding format that is compatible with the application programs existing on the client workstation 28. For example, a Macintosh client might specify a MacPaint format, a PC client might specify a TIFF format, and a Viewpoint client might specify a RES format.

All renderings of a given appearance are identified by the same handle. Therefore, the appearance handle and the rendering specification that are supplied by the user can be employed to determine whether a desired rendering of a particular appearance is or is not available in any of the appearance databases 24. Advantageously, all renderings that are generated are cached by the database 24, as at 41, for some predetermined time period, such as for twenty-four hours, so that frequently requested renderings can be made available to the clients requesting them directly, without any intermediate format conversion or other processing of those renderings. If, however, a user specified rendering of an appearance is not available, the format or formats in which the selected appearance exists in the appearance databases 24 is compared against the user specified rendering format or formats to invoke a suitable format conversion program 42. Typically, a matrix organized table of format conversions 43 is employed for selecting the format conversion program 42. Cached and format converted renderings can be retrieved by the client requesting them via a database file server 44 through the use of a client specified file transfer protocol.

C. The Significance of Just-In-Time and Best Efforts Rendering

The use of the above-described abstract rendering specifications means that a rendering (i.e., a psychophysically equivalent representation of a stored appearance) can be prepared just before it is to appear on an output device, such as the display monitor of the workstation 28 or a printer 46. As a result, environmental and user-specific variables which affect the human perception of the rendering may be taken into account while it is being prepared, including variables such as the lighting conditions under which the rendering is to be viewed, the contrast and color gamut of the output device, and the user's sensitivity to contrast and color. These rendering specifications and the just-in-time rendering that is performed enable different clients to obtain different renderings of the same appearance. They also enable any given client to obtain different renderings of a single appearance at different times. In other words, clients are able to custom tailor the renderings to satisfy their individual requirements.

Accordingly, it will be evident that the client-centered rendering that is contemplated by this invention permits many different transformations to be made to an appearance from the time it is entered into one or more of the appearance databases 24 in a particular format until the time it is retrieved in that or a different format by a client in order to render the appearance on a display or printer. However, these transformations are all related to each other because of their faithfulness to the visual information the author of a document intended to convey, regardless of the encoding format that is initially utilized to specify that visual information or "appearance". Any rendering effectively is a "best efforts" attempt to produce a Psychophysically equivalent representation of a stored appearance. Psychophysically equivalent rendering does not, however, require a bit-by-bit correspondence between a stored appearance and a rendering of it. Rather, it merely requires that the rendering closely conforms to the original or stored appearance on a human perceptual level. This means, for example, that appearances can be stored as analog images on, say, microfilm, for retrieval by rescanning. It also means that angle of view transformations may be applied to pixel patterns representing geometric shapes to compensate for the viewing angle distortions of their shapes. For instance, such a transformation may be employed to produce a non-square pixel pattern for representing a square, so that the pixel pattern appears to be a square to the human eye when viewed at an oblique angle.

D. Management of Queries and Renderings

In keeping with an important feature of this invention, all database operations for any client are invoked by remote procedure calls (RPC's) which comprise two distinct parts; one part (hereinafter referred to as a "Locate" RPC) to initiate the desired database operation, and another part (referred to below as a "LocateMore" RPC) to check on its progress. Both of these calls cause the database server to return the same information to the client; viz., a file location where any available results from the called operation can be found, an indication of the progress that has been made toward completing the operation, an estimate of when the operation is expected to be completed, and a "progress heartbeat" which changes only if the called operation has performed additional work. This information is provided by a "running-server-estimate," which is composed of four fields containing integer values to give (1) the location of results file (suitably, a −1 value is entered into this field if the file location is unknown), (2) an estimate of the work still pending (typically, a 0 value indicates all work is done, and a −1 value indicates there is no estimate), (3) estimated time in seconds to completion (again, −1 may indicate it is unknown), and (4) estimated time in seconds until more results are available (once again, −1 if unknown).

These so-called running-server-estimates have three important uses. First, they give the client access to partial results, which may be especially beneficial while a rendering is being generated because that can be a lengthy procedure. Secondly, they provide feedback to the client with respect to the progress that is being made. Furthermore, they facilitate optimized polling by the client for server results based on a client selected optimization criterion. For example, a client desiring minimal involvement with a database operation can call the database server for results at the predicted completion time. Then, if the operation has not been completed when such a client calls for results, the client can use the updated completion estimate that is returned in response to that call to determine an appropriate callback time. Conversely, a client wanting to more closely follow the progress that is being made on a database operation may call the server more frequently, but duplicative running-server-estimates will be returned to that client if such calls are made so frequently that there is no progress to report from one call to the next (i.e., if the progress heartbeat is unchanged).

E. Document Handles

As previously pointed out, a unique document handle is generated for each new appearance that is entered into any of the appearance databases 24. A single handle collectively refers to all possible renderings of any given appearance. These handles are enduring and may be saved by clients for indefinitely long periods for later use in retrieving appearances. Moreover, distributed file systems independently generate globally unique document handles for the different appearances that are entered into them, without using a central registry or database for the handles.

Each document handle has two encodings; a binary encoding composed, for example, of a sequence of thirty-two 8-bit bytes, and a text encoding composed, for example, of two uppercase hexidecimal digits to represent each of the binary encoded bytes (to save space, any trailing zero bytes of the binary encoding may be dropped from the text encoding). As described more fully hereinbelow, the binary encodings of the document handles are used in a remote procedure call interface for the database server or servers, while their text encodings are used to refer to document appearances in their corresponding descriptions (document descriptions can contain only text for ease of use by client and server software).

Document handles provide a hierarchical identifier space. To that end, they are divided into a variable number of fields, and the interpretation of each of these fields may depend on the context set by the immediately preceding field. Clients employ these handles as simple identifiers, so they need not interpret their contents. Database servers, however, interpret the handle contents to extract encoded information about the related appearance, such as its storage location. More particularly, a server for a simple system having a single appearance database typically simply maintains an index of all locally known document handles, but a server for a more sophisticated database system could utilize a document handle to determine whether the corresponding appearance is stored in one of several local databases or whether another server has to be contacted to obtain the appearance.

A suitable internal format for a basic document handle is as follows (binary field lengths in bits is noted when not variable):

<documenthandle|256> = <handle type|8><field> ... <field> where:
<field> = <field type|16><field bytes>;
<field type|16> = <uniqueness rule|11><field length|5>;
<field length> is the number of bytes in <field bytes>; and
<handle type> = 1.

As will be appreciated, more than one handle type may be needed for more sophisticated systems, so in that case <handle type> may not equal 1. Suitably, a <field type> containing all zeros, is reserved to indicate that there are no more fields in a given handle.

A typical set of uniqueness rules for these documents handles are listed below, together with their binary field formats, but it is to be understood that additional field types would be required for enabling the document handles to encode the hints about database and document locations that might be needed by the servers for more sophisticated database systems:

rule 1: <registered host id|16><timestamp|32>[<tie-breaker>]
rule 2: <Sun host id|32>[<tie-breaker>]
rule 3: <IP host id|32><timestamp|32>[<tie-breaker>]
rule 4: <ether host id|48><timestamp|32>[<tie-breaker>]
rule 5: <relative id>(unique relative to previous field)
rule 6: <data offset|32>[<relative id>]
rule 7: <data offset|32><data length|32>[<relative id>]
rule 8: <Pup host id|16><timestamp|32>[<tie-breaker>]
rule 9: <handle subtype|8>[relative id>]

The handle subtypes (uniqueness rule 9) that have been defined so far are:
0×01: document is immutable
0×02: document is a description As previously pointed out, document handles also have a text encoding, so a uppercase hexidecimal text encoding of a representative example is set forth below, together with an explanation of its fields:

handle:010121030107592222864BE25C where:
01 means handle type 1;
0121 means uniqueness rule or field type 9, length 1;
03 means handle subtype 0×03 (immutable description);
0107 means uniqueness rule or field type 8, length 7;
5922 means PUP address: 313#42#;
22864BE2 is a Unix convention timestamp for Mon May 9 17:16:34 1988;
5C is a tie breaker integer value for providing additional resolution to the timestamp; and
(00 ... 00) are omitted (i.e., 13 bytes used, 19 unused).

II. A DETAILED EMBODIMENT

A. Introduction

Figure 4:
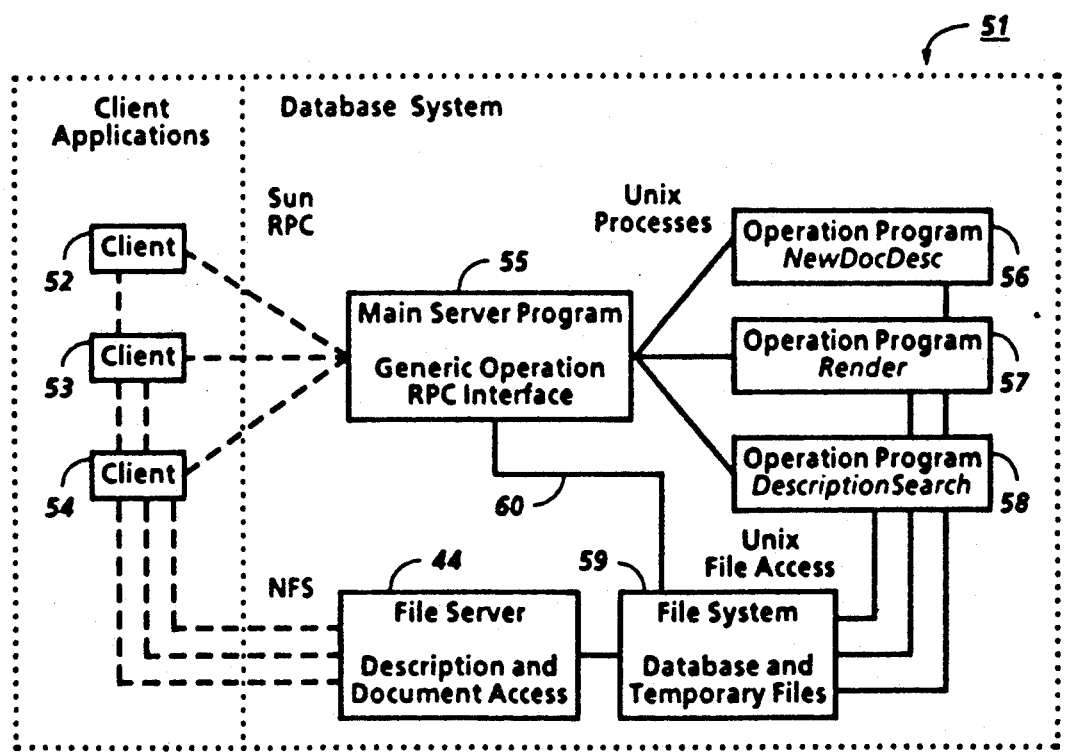
FIG. 4 is a block diagram illustrating a specific implementation of the present invention.

Referring to FIG. 4, the database system 51 of the present invention conveniently is implemented by running a Unix database server on a Sun workstation (not shown) having a standard Sun RPC interface for communicating with remote client application programs 52–54. The client applications 52–54 may take various forms, including document storage and retrieval applications, database search applications, input scanner server programs, and print server programs. The server programs for the database system 51 are written in the rpcgen, C and C-shell programming languages, and document descriptions and appearances are stored by the database using a hierarchy of Unix file directories.

As shown, the database system 51 includes a main server program 55 for communicating with the remote client applications 52–54 via the Sun RPC interface. This main server program 55 merely carries out a basic database protocol using three remote procedures: Locate, LocateMore, and ReleaseOp. Specific database operations, such as a NewDocDesc operation program 56, a Render operation program 57 and a Description-Search operation program 58, are handled by individual programs which are forked from the main server program 55 as separate Unix processes. These operation programs 56-58, in turn, communicate their results back to the server program 55 via their standard outputs. Accordingly, it will be evident that the functionality of the database system 51 can be extended easily by adding further database operation programs to it, such as for user customized search and conversion operations. As previously pointed out, files are transferred back and forth between the client applications 52-54 and the databases 59 of the database system via one or more network file servers 44 through the use of client specified file transfer protocols. The main server program 55, on the other hand, has direct access, as at 60, to the temporary and permanent files within the appearance and description databases 59.

A. The Main Server Program

Figure 5:
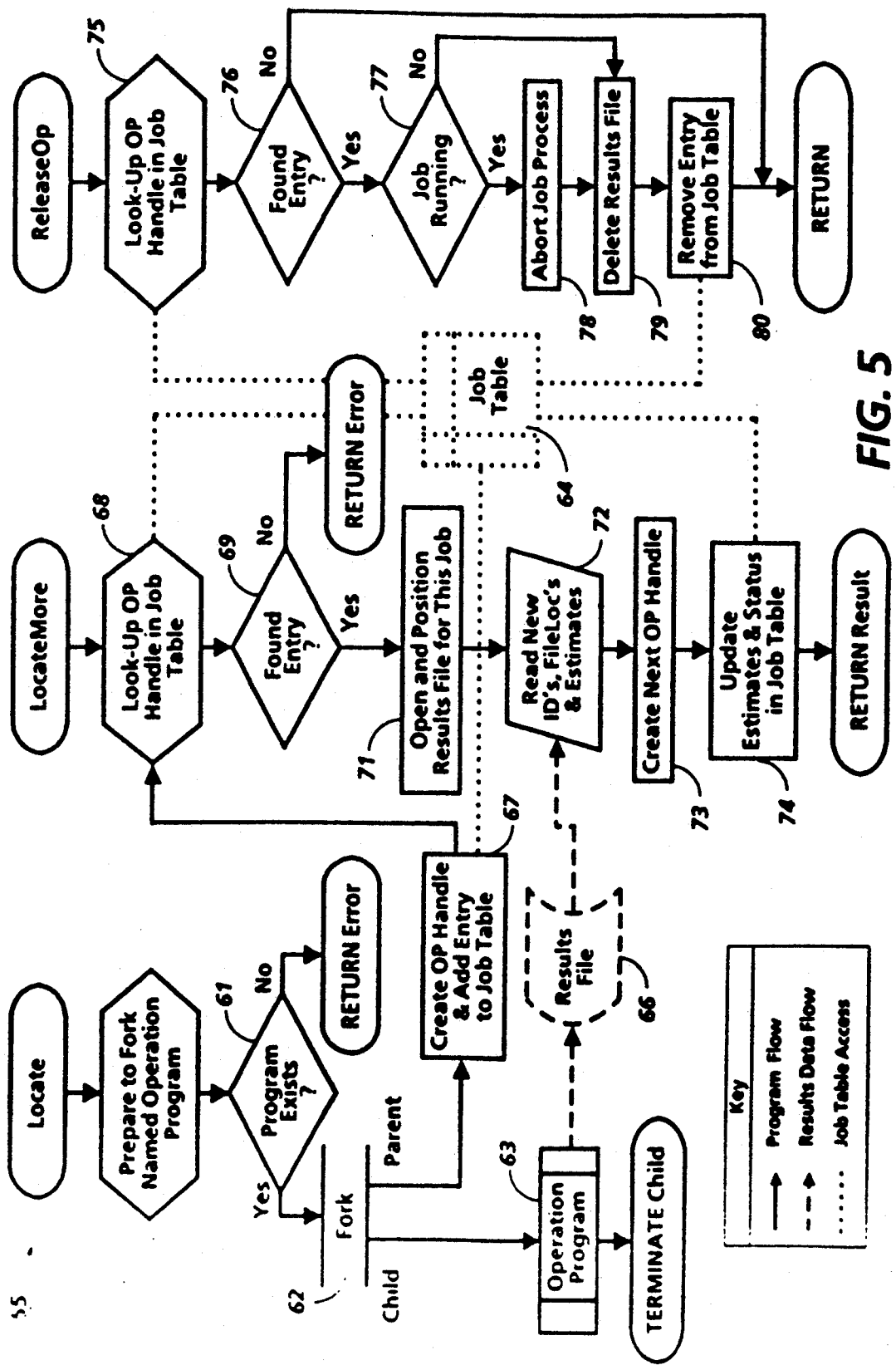
FIG. 5 is a flow chart illustrating a main server program for the implementation shown in FIG. 4, with the control flow of the program being shown in solid lines, the results data flow being shown in dashed lines, and the job table access being shown in dotted lines.

Turning to FIG. 5, it will be seen that the main server program 55 receives remote procedure calls from the client applications 52-54, invokes appropriate database operation programs for performing requested database operations for the clients, tracks the progress of the client requested database operations, and returns the results of those operations to the clients requesting them. Suitably, the main server program 55 is implemented using the rpcgen and C programming languages.

As will be recalled, the RPC protocol that is used to carry out this invention defines three remote procedures; Locate, LocateMore, and ReleaseOp. The Locate and LocateMore procedures enable the clients to obtain partial results quickly from the database operations they request. Specifically, those procedures often make partial results available while the requested database operation is being performed, rather than requiring the client to wait for results until the operation has been completed. To that end, an operation "id" or handle is returned to the client with each result of a requested database operation, and this handle is used in the client's next call for the same operation to get additional results and updated status information concerning the progress of the requested operation. Each of these operation handles simply occupies a position in the result stream that is returned to the client, so any of them can be reused, even after later produced results have been returned. For example, an operation handle can be reused to request retransmission of results. Also, such a handle can be reused to filter the results differently by specifying a different "result type," as more fully described hereinbelow.

The main server program 55 uses the following Unix environment variables to set the database locations and other values (typical default values for a database system known as "System 33," which runs a Sun NFS file transfer protocol named "N" on a server named "ansel.-parc.xerox.com" in the Arpa host name space, are indicated parenthetically):

S33SERVER—protocol and server name (Nansel)
S33DBDIR—database directory (/ansel104/system33)
S33BINDIR—program directory (/ansel104/system33-/bin/3.5)
S33DEBUG—integer encoding of debugging flags (0×5F)
S33GROUP—ID of Unix group having authorized access to restricted operations (33)
S33CTIME—seconds for client timeout (600)
S33STIME—seconds for hung operation program timeout (300)

The database operation programs 56-58 (FIG. 4) also have access to these environment variables.

1. The Locate Procedure

The Locate procedure takes the following arguments from the client invoking it: a client identification string, operation program arguments including an operation program name and a list of string arguments, a 32-byte document handle, a list of file protocol and server names, a list of format names, an integer time limit, an integer result buffer size, and an integer result type. In the illustrated embodiment, arguments are passed to the database operation programs 56-58 (FIG. 5) by the Unix "argv" mechanism.

Typically, the client identification string ("LocateArgs.userName") contains the registered name of the individual accessing the database system 51. The first string in the program arguments ("LocateArgs.locateSpec") is the operation program name, so it determines the database operation that is to be performed. The interpretation of the remaining strings in the program arguments and of the other procedure arguments are dependent on the named database operation, so some of those arguments may be empty or zero if the named operation does not require them. As shown in FIG. 5, the Locate procedure causes the main server program 55 to check the program directory, as at 61, for an executable Unix file corresponding to the named database operation. If such a file is found, the main server program 55 forks, as at 62, the named operation program 63 as a child process and passes the remaining operation program arguments to it.

Briefly reviewing the other procedure arguments a client may specify when invoking the Locate procedure, it is to be understood that the document handle argument ("LocateArgs.docId") is used for retrieval operations to identify a particular document (i.e., description or appearance) that is stored within the database. This argument can also be used for storage operations when it is desired to add either a new description or a new version of an existing appearance to the database. The server/protocol name argument array ("LocateArgs.locFilters.servers") not only is useful for identifying the file transfer protocols and/or servers which the client can utilize for retrieving documents from the database, but also is useful for specifying the protocol and server by which the database can access the client's files for document storage operations. Similarly, the format names argument ("LocateArgs.locFilters.formats") can be employed (a) for retrieval operations to specify the document encoding formats the client is willing to accept, and (b) for storage operations to specify the encoding formats of the client's files. The value of the time limit argument ("LocateArgs.locFilters.timeLimit"), in turn, permits the client to specify (a) how long it wants results of retrieval operations to be maintained on the operation the network file server 44 (FIG. 4), and (b) how long the client's files will be valid for storage operations. Furthermore, the result buffer size argument ("LocateArgs.bufferSize") enables the client to specify the maximum number of results data bytes it is willing to receive in a single reply packet (exclusive of network packet overhead).

The result type argument for the Locate procedure ("LocateArgs.locate Spec") specifies the form of the results that the client is requesting. Various options may be encoded by this argument including return only the number of matches that are found, return the document handles of the matches, return the file locations of the matches, return a time estimate only but do not perform the named database operation, return both the locations and the file lengths of the matches, return only the document handle and/or file location of the first match found, and returned file locations may specify files with non-zero offsets.

Focusing again on FIG. 5, after the main server program 55 forks a child process for initiating the named database operation 63, its Locate procedure creates an operation handle for the procedure and enters the operation handle into a job table 64, as indicated at 67. Then the Locate procedure looks up its operation handle in the job table 64, as at 68, to confirm that it has been entered, as at 69. If the entry cannot be found, an error message is returned to the client. If, however, the operation handle is found, the Locate procedure causes the database server to establish a results file 66 for the database operation 63 at an identified location, as indicated at 71.

As will be recalled, the database operation 63 transfers its results (including the running-server-estimates of the progress it is making) into the results file 66 for that particular operation via its standard output. The Locate procedure, in turn, reads out the current running-server-estimates from the results file 66, together with any other results that are available, such as document handles and/or file locations, as indicated at 72. Thereafter, the procedure creates an operation handle for the next procedure, as at 73, and it then enters that handle and the current running-server-estimates into the job table 64, as indicated at 74. Finally, to complete the Locate procedure, the results are returned to the client.

Results suitably are returned to the client in a results stream which typically comprises an error code which has a "no error" value (e.g., 0) if no database server error has occurred, the integer encodings for the up-to-date values of the above-enumerated running-server-estimates, an integer encoding of the number of results (sometimes referred to as the "number of matches") being returned, an 8-byte operation handle for the next procedure (this handle also identifies the results that are being returned in response to a particular call). Additionally, depending on the results type specified by the client, the results that are returned may include a list of document handles, server file locations and/or server file locations and file lengths corresponding to the matches being returned. The client does not interpret the operation handle that is returned to it. Instead, it merely passes the handle to the LocateMore procedure to obtain further results from the database operation 63 or the ReleaseOp procedure to terminate the database operation 63, depending on whether the running-server-estimate that is returned with the handle indicates the database operation 63 is finished or not.

2. The LocateMore Procedure

As will be recalled, this procedure is employed to obtain additional results or to review previously returned results using the same or a different result type filter. To that end, it takes the following arguments: an operation handle ("LocateMoreArgs.handle"), an integer result buffer size ("LocateMoreArgs.bufferSize"), an integer result type ("LocateMoreArgs.resultType"). The LocateMore procedure uses the operation handle that is passed to it for checking the job table 64, as at 68, to locate the results file 66 for the database operation 63. That enables the procedure to read out the new results from the results file 66, as at 72, create another operation handle as at 73, update the job table 64 as at 74, and return the results to the client in essentially the same manner as previously described with respect to the Locate procedure.

3. The ReleaseOp Procedure

This procedure is invoked for terminating a database operation and for invalidating its associated operation handles, thereby enabling the database system 51 to release the memory resource it has allocated to the results file 66 for that particular operation. It may be invoked before or after a database operation has been completed, so it may be employed for aborting an operation at the option of the client.

ReleaseOp takes an operation handle for the targeted database operation (i.e., the database operation that is to be terminated) as an argument, thereby enabling it to locate the results file 66 for that operation by looking it up in the job table 64, as indicated at 75 and 76. If the current running-server-estimate for the targeted database operation indicates that the operation is still running at 77, the ReleaseOp procedure aborts the child process for that operation as at 78. Moreover, regardless of whether the targetted database operation has been completed or not, the ReleaseOp procedure deletes its results file 66, as at 79, and removes the entries for the targetted operation from the job table (invalidates their operation handles) as at 80.

B. A Typical Client Application Program

Figure 6A:
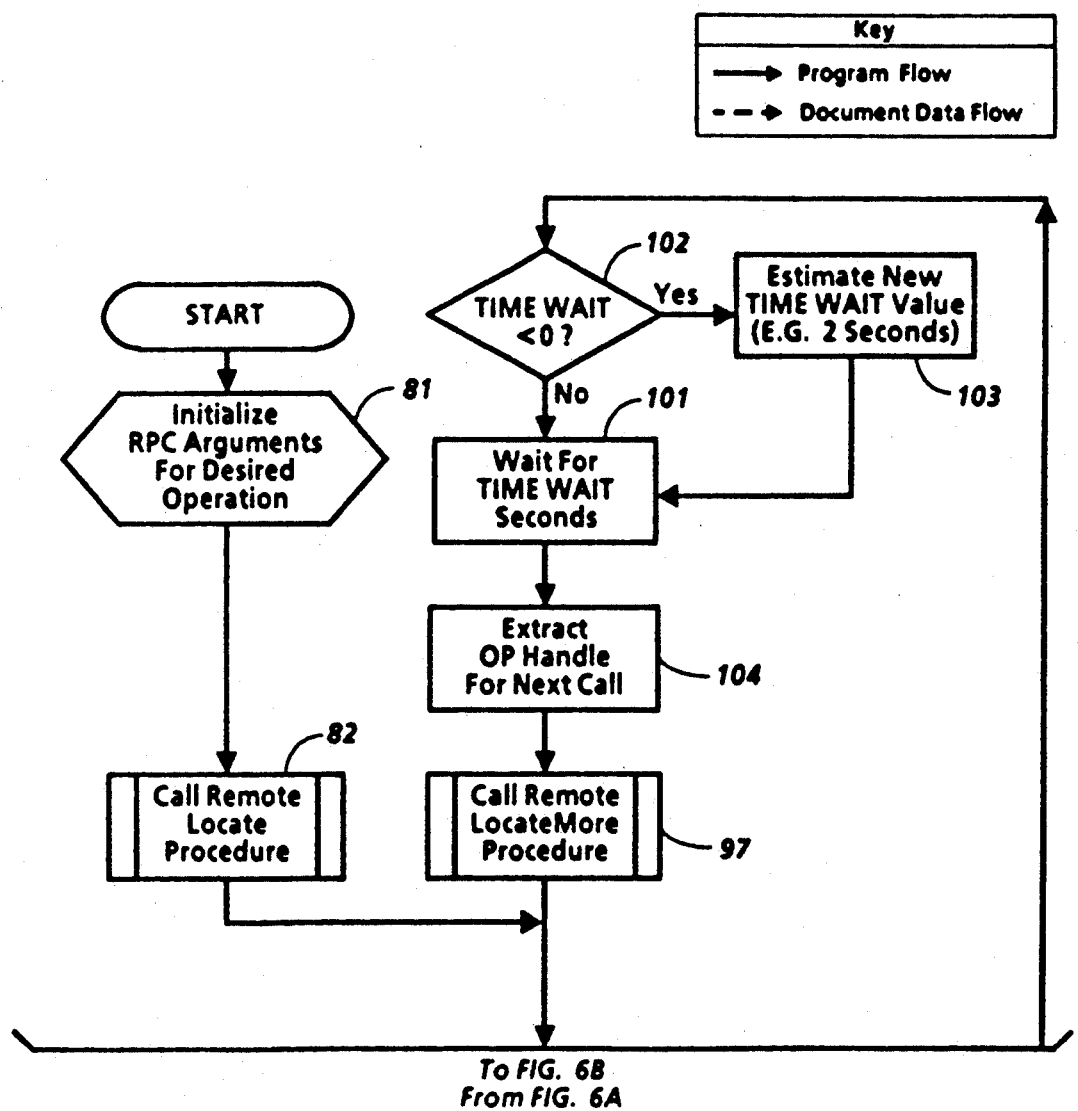
FIGS. 6 (A,B) are a flow chart illustrating a typical client application program for the implementation shown in FIG. 4, with the program control flow being shown in solid lines and the data flow being shown in dashed lines.
Figure 6B:
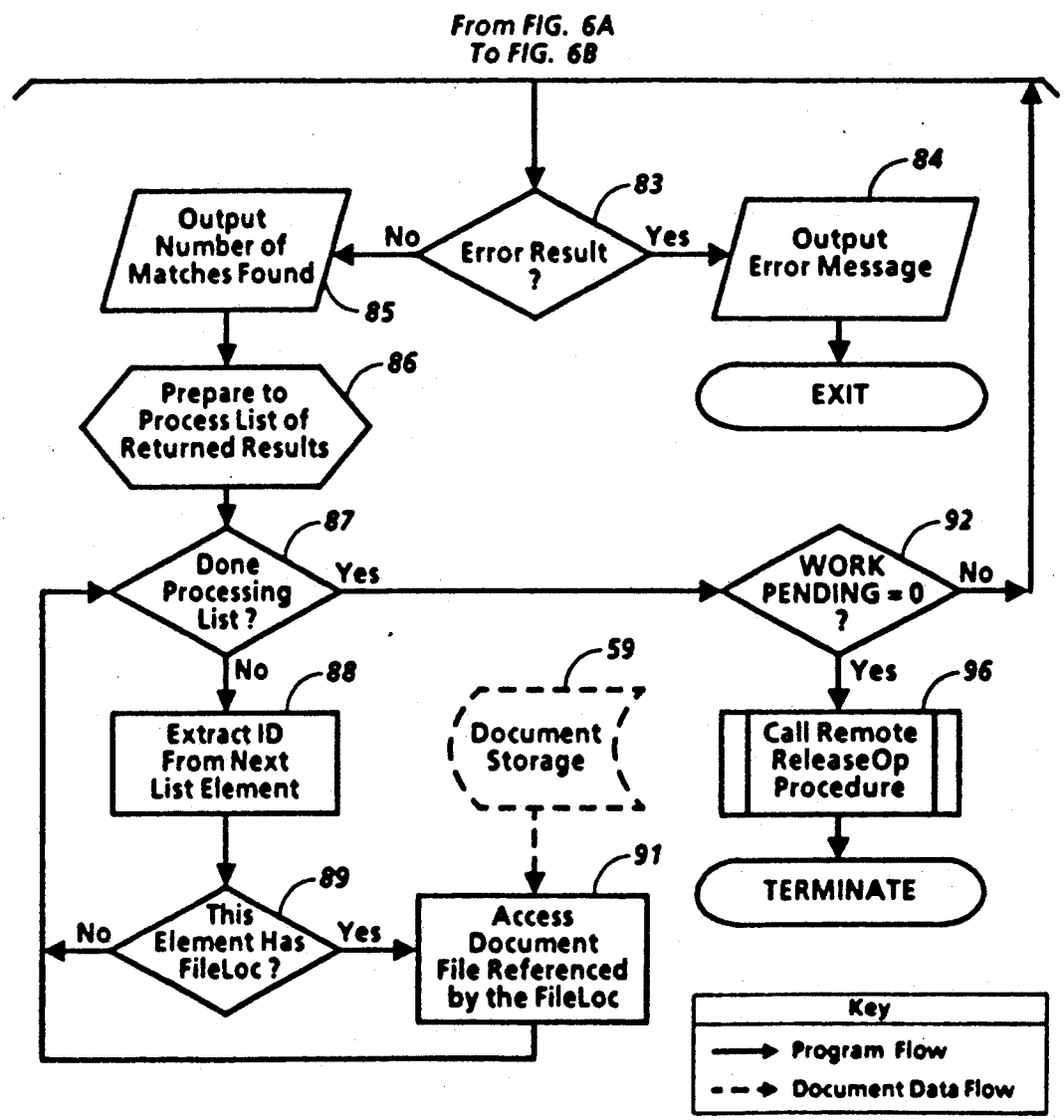

Referring to FIG. 6, it will be recalled that the client applications 52-54 (FIG. 4) furnish the RPC arguments, as at 81, for each database operation, such as the operation 63 (FIG. 5), that is to be performed for them. Thus, to initiate a database operation, the Locate procedure (FIG. 5) is called at 82 to pass the client specified RPC arguments, including the name (e.g., "NewDocDesc," "DescriptionSearch," "Render," etc.) of the desired database operation to the main server program 55 (FIG. 5). If no RPC error occurs, the main server program 55 takes the operation name argument for determining whether an executable program for performing the named database operation is listed by the program directory of the database server or not. If a directory listing for the specified operation program is found, the named database operation is invoked as described hereinabove. If, on the other hand, no listing is found or if the results returned by the Locate procedure contain an error code indicating that a server error has occurred as determined at 83, the client program outputs an error message at 84 and then exits.

When valid results are returned by the Locate procedure, the client program outputs the number of matches that have been returned at 85 and then prepares to process the list of returned results, as indicated at 86. This list, which is empty if the client has specified a "number of matches only" result type, is checked at 87 to determine whether all of the listed results have been processed. If not, the "id" or handle for the next result on the list is extracted at 88, and that result is then checked at 89 to determine whether it includes a file location for the document identified by the extracted handle or not.

If so, as indicated at 91, the client may employ the file location for accessing the subject document in the database system 59 via the specified file server 44 (FIG. 4), even though the database operation may be incomplete and the subject document may only be a partial representation of the ultimate work product of the database operation. After the client program confirms at 87 that all of the results that have been returned by the Locate procedure have been processed, it, checks the running-server-estimate of the work pending, as at 92, and then makes either a ReleaseOp RPC 96 or a LocateMore RPC 97, depending upon whether the requested database operation has been completed or not.

More particularly, if the database operation has further work to perform, the client program pauses, as at 101, before making a LocateMore RPC 97, thereby giving the database operation some additional time to produce further results. The duration of the pause 101 is determined by the running-server-estimate returned in response to the prior call if it contains an estimate of the time until further results are available, as determined at 102. Otherwise, a predetermined pause time 103 is employed. After pausing for the appropriate period, the client program extracts the operation handle for the next call from the results returned in response to the prior call, as indicated at 104. That handle is then passed to the LocateMore procedure (FIG. 5) as an argument of the LocateMore RPC 97.

The client may have to make several LocateMore RPC's 97 to obtain all of the results of a requested database operation. Thus, it is to be understood that the partial results that are returned to the client by each LocateMore procedure are processed by the client program as described above with reference to the processing of the partial results returned by the Locate procedure. That means that the client is able to extract from the LocateMore results the same types of information as it extracts from the Locate results.

In the ordinary course, the client program terminates after first determining at 92 that the requested database operation has completed its work and then making a ReleaseOp RPC 96 to delete the results file 66 for that particular operation and to remove the related entries from the job table 64 (see FIG. 5).

C. Typical Database Operation Programs

As shown in FIG. 5, all database operation programs 63 are forked as child processes of the main server program 55. Consequently, this facilitates adding further database operation programs to the database server, such as programs that are custom tailored to perform database operations designed to satisfy the unique requirements of certain client application and/or users. Indeed, a virtually limitless variety of database operation programs are possible, so only a few basic database operation programs will be described to provide some representative examples.

Arguments for the various database operations conveniently are passed to the main server program 55 by the client applications 52-54 (FIG. 5). The LocateMore and ReleaseOp procedures take relatively few arguments, so the organization of their arguments is relatively straightforward. However, the Locate procedure takes a greater number of arguments, so it may be helpful to briefly outline a suitable organization of them. As will be understood, one of the initial arguments for a Locate procedure advantageously contains the program name for the database operation that the client wants to perform. It then is followed by the program arguments (i.e., the arguments the server program 55 passes on to the named database operation program and they, in turn, are followed by additional procedure arguments identifying further client requirements, such as the handle of a database document that is to be rendered for the client, acceptable servers and/file transfer protocols for transferring documents to or from the client (this string may be empty if any available server and file transfer protocol are acceptable), document encoding formats used by or acceptable to the client (for documents that are to be stored or rendered, respectively), and result types requested by the client.

1. Adding Documents and Descriptions to the Database

Figure 7:
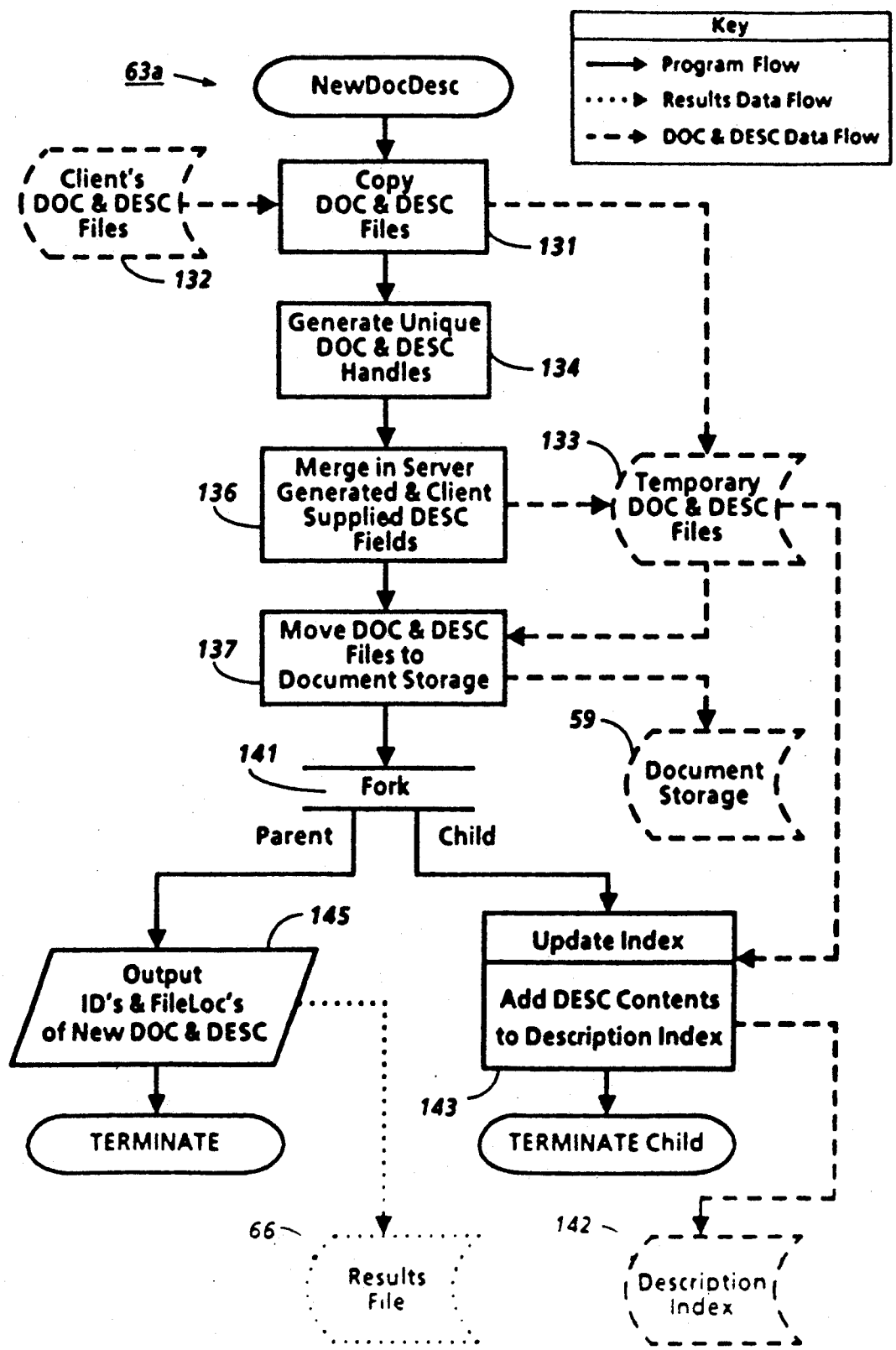
FIG. 7 is a flow chart illustrating a NewDocDesc operation program for adding new documents and/or descriptions to the data bases of the implementation shown in FIG. 4, with the program flow being shown in solid lines, the results data flow being shown in dotted lines, and the document data flow being shown in dashed lines.

Turning now to FIG. 7, there is a NewDocDesc program 63a for enabling clients to add new documents and/or new descriptions to the appearance and description databases, respectively. To that end, when a client requests the service of this program, NewDocDesc copies, as at 131, the client specified document and/or description files 132 into a temporary database file 133. The server, in turn, generates a unique handle at 134 for the temporary file, and the NewDocDesc program 63a then records the handle, together with any other server generated description fields, in the temporary file 133. That merges the server generated description fields with the client supplied description fields, as indicted at 136. Thereafter, the new document and/or description files are transferred at 137 from the temporary file 133 to more permanent database file locations 59. In the illustrated embodiment, a child process is forked from the parent NewDocDesc process at 141 for updating the database description index 142 with the contents of the new description, as at 143, and the child process is then terminated. Additionally, while the description index 142 is being updated, the parent process records the identification handles and file locations of the newly added document and/or description in the operation results file 66, as indicated at 145, and it then terminates.

If a new document is to be added to the database, the first string in the program arguments for the NewDocDesc process typically is the file name under which a copy of the document is available from the client, and the next string is empty. Furthermore, when both a document and a description are to be added to the database, those two strings suitably are followed by either another empty string or by a name of a description file that is to be included in to the new description. Any client specified search domains for an existing description within the database may be contained by the next string, and that string may then be followed by an empty string to indicate that all remaining program arguments are pairs of client specified attribute names and values that are to be inserted into the existing description. To provide still another example, when adding a new description for a document already residing in the database, the program arguments additionally specify the handle of the existing or resident document, but they otherwise are generally the same as when a new document is being added.

While performing NewDocDesc database operation, the database server either verifies (by means not shown) a document handle that has been supplied by the client (i.e., for adding a new description for an existing document) or creates a new database document from a client named file. Furthermore, whenever a new document is added to the database, the server returns a unique handle and/or a file location for that document to the main server program 55, (FIG. 5), with the result type specified by the client determining whether the handle and/or file location are returned to the client.

Whenever a new document description is added to the database, the server completes the following fields of the new description: DescID, ThisDescID, DescCreateDate, DescCreator, DocID, DocFormat (added only to a description for a new document). Additionally, while adding a new description to the database, the server appends to it the fields from any attributes in the program arguments, as well as the fields from any description file named by the client. Advantageously, a mutable and an immutable version of each description are stored in the database, so after creating such a description the server returns the document handle and/or file location for both the mutable (e.g., DescID) and the immutable version (e.g., ThisDescID).

2. Database Searches

Figure 8A:
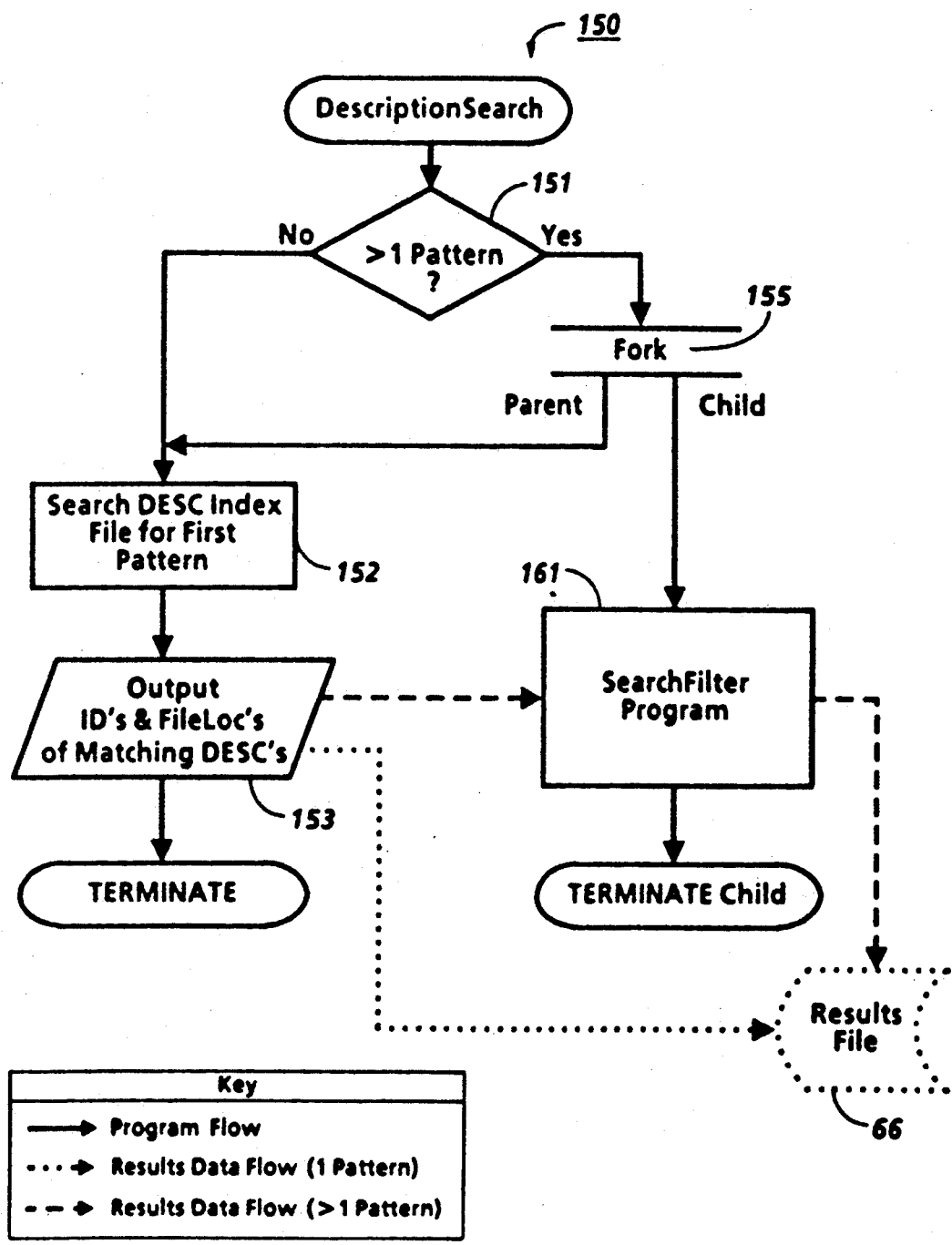
FIG. 8A is a flow chart illustrating a Description-Search operation program for the implementation shown in FIG. 4, with the program flow being shown in solid lines and the data flow being shown in dotted and dashed lines for single and multiple search pattern cases, respectively.
Figure 8B:
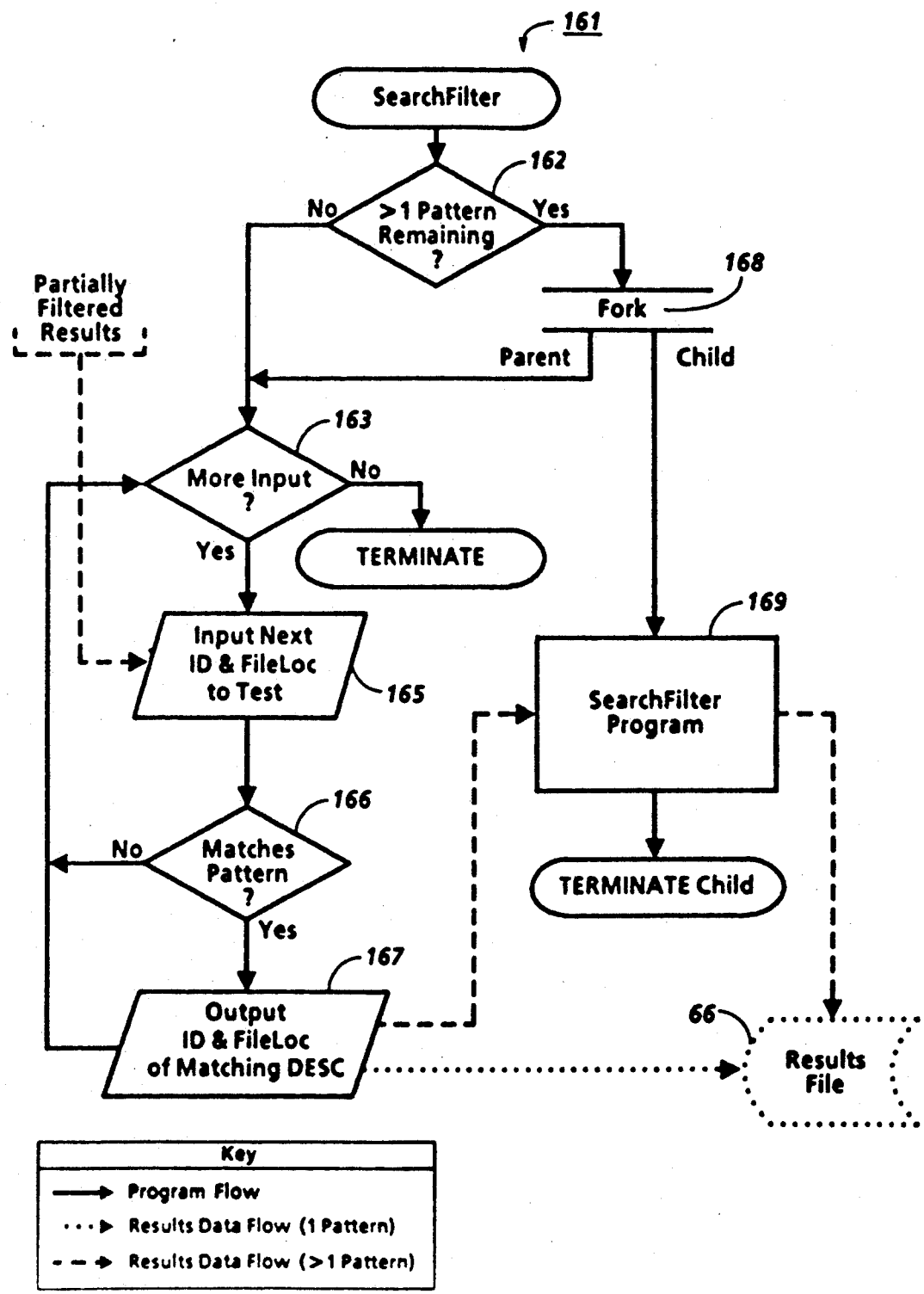
FIG. 8B is a flow chart illustrating a recursive Search ilter program that is invoked by the DescriptionSearch program shown in FIG. 8A for second or higher order filtering of the search results, with the program flow being shown in solid lines and the data flow for second order and higher order filtering being shown in dotted and dashed lines, respectively.

As shown in FIGS. 8A and 8B, there also is a DescriptionSearch operation for searching one or more client specified fields of the database descriptions that are located within a client specified search domain (e.g., a named database) for matches to one or more client specified search patterns. "Pattern type" arguments typically are employed to enable the client to formulate search queries specifying various degrees of pattern matching. For example, an "equal" search type argument may be employed to indicate that exact matching is required, a "prefix" argument may be employed to identify matches prefaced by a specified search pattern, and a "wildcard" argument may be employed to indicate that anything matches any wildcard characters ("*") within the search pattern.

The initial program argument for this operation typically is the search domain, and the remaining program arguments conventionally are triplets specifying the pattern type, the field name and the search pattern for one after another of the "search filters" that have been built into the search query. As will be appreciated, the above-described result type arguments can be used to particular advantage while performing a database search because they allow the results that are returned to be tailored to the specific needs of the client.

Considering FIG. 8A in further detail, it will be seen that the DescriptionSearch program 150 checks its arguments at 151 to determine whether the client has specified more than one search pattern or not in its search query. If only a single search pattern has been specified, the client specified fields of the description index 142 (FIG. 7) for the database is searched for matches at 152, and the identification handles and the file locations of the matching descriptions are output at 153 for recording in the results file 66 (FIG. 5). If, however, the search query specifies more than one search pattern (i.e., if second or higher order filtering of the results is required), a child process is forked from the parent program at 155 to invoke a SearchFilter program 161 (see FIG. 8B). The parent DescriptionSearch program 150 then performs the search 152 for descriptions matching the first search pattern (i.e., the first order filtering), but it terminates after outputting the handles and file locations of the matching descriptions it uncovers as indicated at 153, for additional filtering by the SearchFilter program 161.

To carry out the higher order filtering of the search results, as shown in FIG. 8B, the SearchFilter program 161 filters the partial results it receives from the Description Search program 150 in accordance with one after another of the higher order search filters of the search query. To that end, if it is determined at 162 that the search query contains only one additional search pattern (i.e., a search pattern not previously matched against the results), the SearchFilter program checks at 163 to determine whether there are any partial results to be tested against this previously unmatched pattern. If there are no partial results, the program terminates. If, however, one or more descriptions have satisfied the lower order filtering (e.g., the first order filtering), the handle and the file location of one after another of those descriptions are input at 165, so that the corresponding descriptions can be retested at 166 to determine whether they satisfy the next higher order filter or not. The handles and file locations of the descriptions that match the higher order filter are output at 167, either for recording in the results file 66 or for further filtering by the SearchFilter program 161 as described below, depending on whether the search query requires any further filtering of the search results or not.

Several recursions of the SearchFilter program 161 may be required to bring a search to its conclusion. More particularly, if it is determined at 162 that the search query requires filtering the results of the DescriptionSearch program 150 in accordance with more than one higher order search pattern, the SearchFilter program 161 screens the first order filtered results, as described above, for descriptions satisfying the next higher order (i.e., second order) search filter. However, in this situation the results the SearchFilter program outputs at 167 still are only partially filtered, so the program forks a child process at 168 for recursively invoking itself, as indicated at 169. This recursion of the SearchFilter program utilizes one after another of the handles and file locations that are output at 167 by the parent SearchFilter program 161 for serially accessing their corresponding descriptions to determine whether those descriptions satisfy the next higher order search filter or not. Consequently, the handles and file locations of the descriptions that are found to satisfy this higher order filtering are output, either as fully filtered results for recording in the results file 66 or as partially filtered results for still another recursion of the Search Filter program 161. As will be appreciated, search results are recorded in the results file 66 only after it has been confirmed that the corresponding descriptions respond faithfully to the search query, but some fully filtered results may be available for return to the client while other partially filtered results still are being tested.

3. Retrieving Document Appearances

Figure 9A:
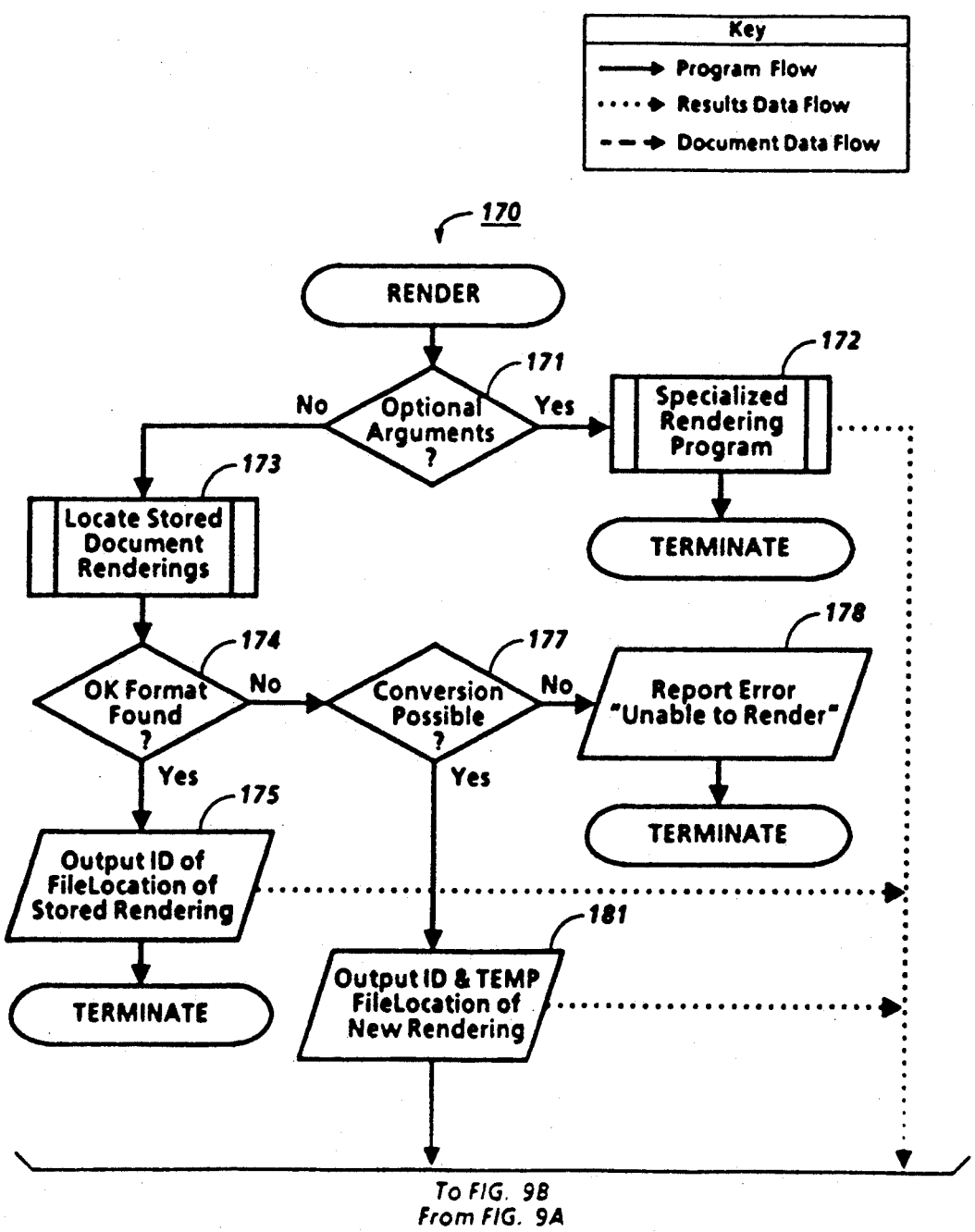
FIGS. 9 (A,B) are a flow chart illustrating a Render operation program for the implementation shown in FIG. 4, with the program control flow being shown in solid lines and the results and document data flow being shown in dotted and dashed lines, respectively.
Figure 9B:
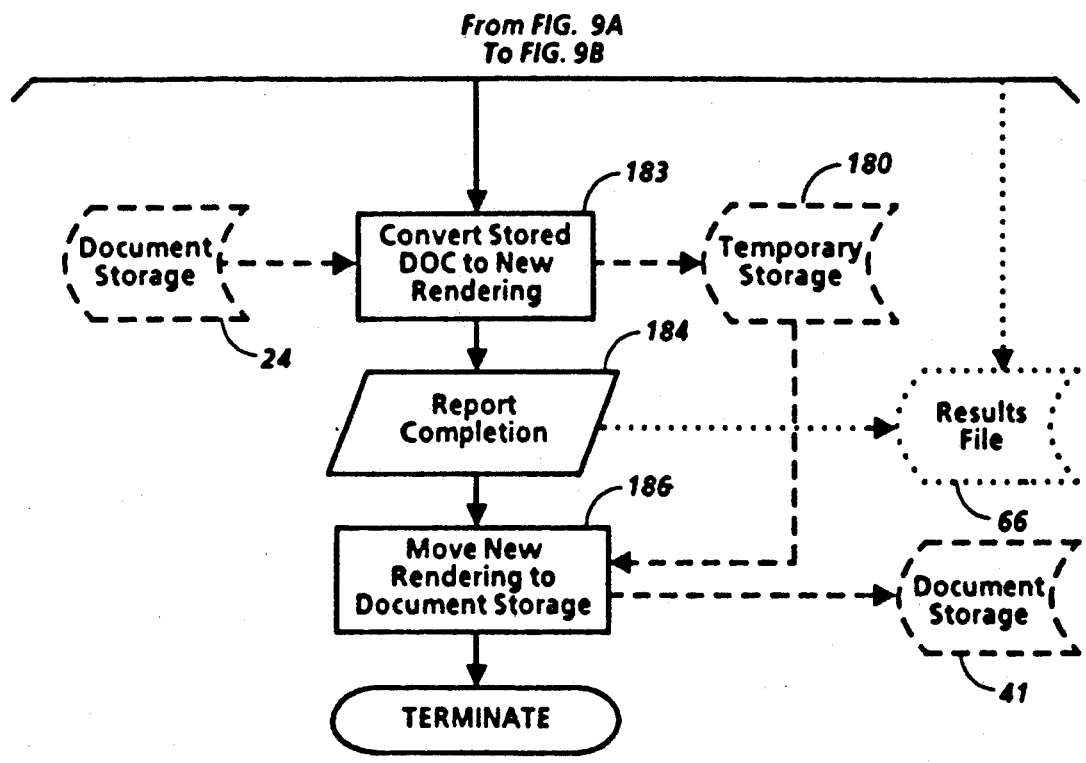

Referring next to FIG. 9, a render operation 170 uses a document handle to locate a corresponding document in the database and, if necessary and possible, transforms the document into a client requested representation or "rendering." An initial argument names the operation program ("Render"); the next group of strings contain optional program arguments for the Render operation (and may be empty if the client wishes to use a default rendering process such as shown). Typical result type options for this operation include return the file location(s) of the rendered document, return an estimate of the time required for performing a specified transformation but do not perform the conversion, and return file length(s) with the file location(s).

As illustrated, when the render operation program 170 is invoked, it first checks at 171 to determine whether the first argument following its program name specifies a specialized or custom tailored rendering program 172. Unless a specialized rendering program 172 is specified, the render operation invokes a default process during which it uses the document handle that is provided by the client to locate, as at 173, the database stored rendering or renderings of the corresponding document (as will be recalled, the database may contain multiple renderings of a document under the same handle because all renderings advantageously are cached for a predetermined amount of time, such as twenty-four hours). The process then compares, as at 174, the formats of the renderings it has located against the rendering format(s) specified by the client. If a stored rendering having an acceptable format is found, its file name and location is output at 175 for recording in the process results file 66, and the rendering program 170 then is terminated. If, on the other hand, no acceptably formatted rendering is found, the rendering program 170 checks a look-up table to determine, as at 177, whether any of the available rendering can be converted into a client requested format or not. If not, it reports an "unable to render" error, as at 178, and then terminates. Of course, additional conversions may be added to the rendering program 170 as desired, so if a conversion is requested sufficiently frequently to warrant its inclusion, it may be provided and the look-up table may be updated to include it.

For preparing a rendering of a format converted document for a client, the illustrated default rendering process causes the database server to create a temporary file 180 with a server assigned file name for the converted rendering. The name and location of this temporary file are output at 181 for recording in the results file 66. Then, the default process retrieves the document that is to be converted from the appearance database 24 (FIG. 3) and begins to convert it into the desired format at 183. The formatted converted encoded representation of the document is written into the temporary file 180 while it is being generated, so partial results of the conversion are available to the client, even before the document has been fully converted. Upon completing the conversion 183, the rendering process 170 reports its completion at 184 for recording in the results file 66, and then caches the converted rendering in the cache memory portion 14 of the appearance database 24 (FIG. 3), as indicated at 186.

Individual users or user groups may employ specialized rendering programs 172 to custom tailor the renderings they retrieve to their requirements. Renderings can be generated on a "just-on-time" basis, so a virtually limitless variety of renderings may be provided, without requiring excessive document storage capacity for the appearance database 24 (FIG. 3). Indeed, a user/client can take advantage of the "just-on-time" rendering capabilities of the rendering program 170 to invoke different specialized rendering programs 172 at different times for producing renderings that are more or less optimized to the different environmental conditions under which, or the different output devices upon which, the user wishes to view them.

For example, a relatively straightforward specialized rendering program 172 may be provided for custom tailoring a bitmap rendering of a document. This rendering option typically would be invoked by specifying its name (e.g., "rastershrink") as the first string of the program arguments. It would require nine other integer arguments (encoded as separate decimel ascii strings) for specifying the optimal, minimum and maximum pixel content of a customized bitmap rendering along its x, y, and z-dimensions. The rastershrink rendering option could interpret those arguments in the following order: width, height, depth, minWidth, minHeight, minDepth, maxWidth, maxHeight, and maxDepth. In that event, the rendering operation program 170 could be requested to prepare a bitmap rendering having a xyz bounding box containing between $(64 \times 64 \times 1)$ and $(200 \times 200 \times 1)$ pixels, with a preferred size being specified as $(150 \times 150 \times 1)$ pixels, by passing the following arguments to it: render, rastershrink, 150, 150, 1, 64, 64, 1, 200, 200, 1.

D. User Interface Examples

Various user interfaces may be employed to take advantage of the present invention. Some of them may be specialized for particular uses of the database system, while others may be more generalized. A few window-based interfaces are described hereinbelow, but it is to be understood that these examples merely illustrate a few of the interface options.

Figure 10:
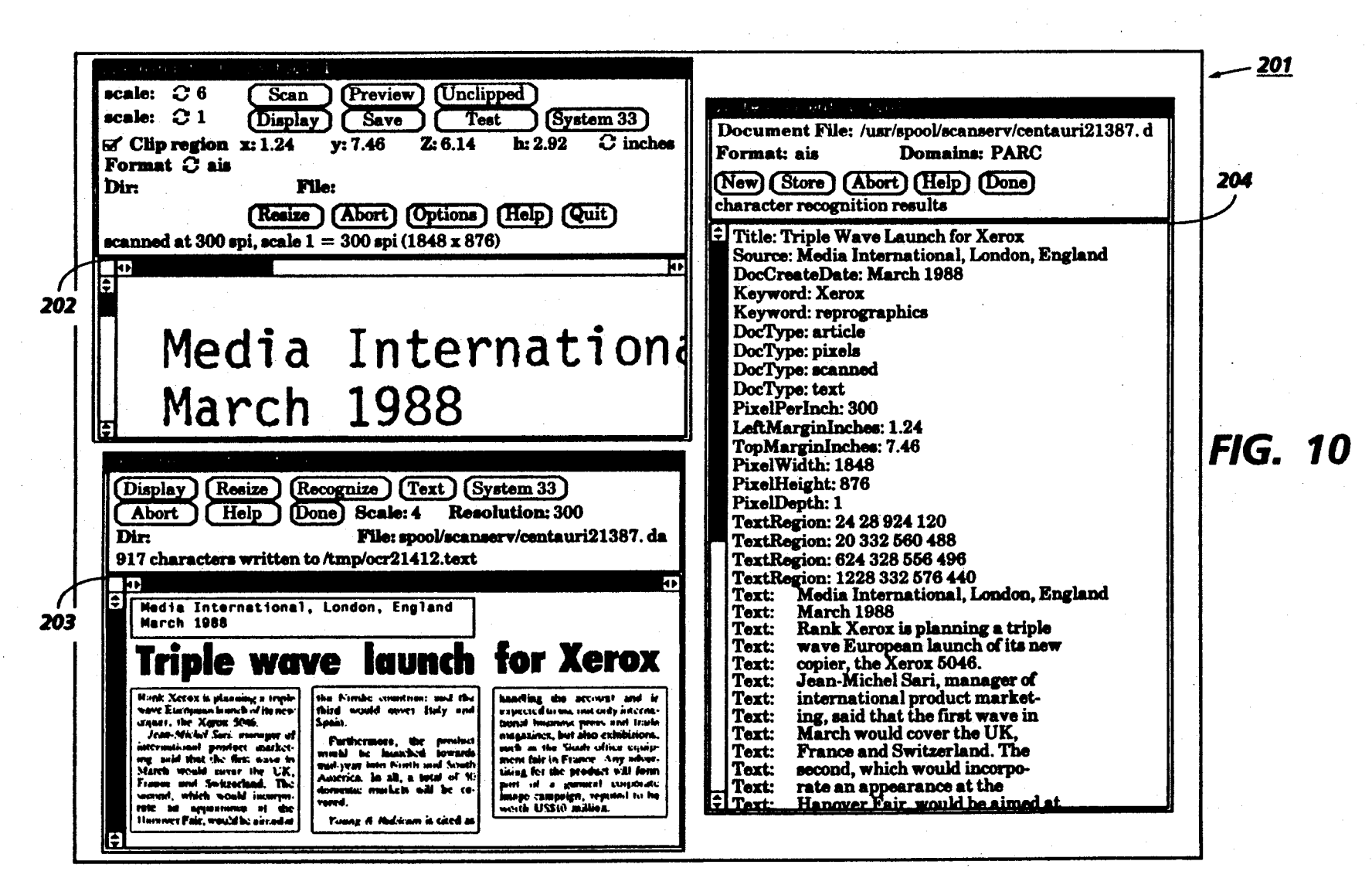

FIG. 10 illustrates a user interface 201, which operates in the Sun Unix "suntools" environment, for enabling a Sun workstation user to: (a) set the options for an associated input scanner and view the bitmap representation of a scanned-in image in one window 202, (b) set the options for a resident character recognition process and view the recognized text in a second window 203, and (c) set the options for entering a new document and/or a new description into the database of the present invention and view the server generated and the client specified fields of such a description in a third window 204.

Figure 11:
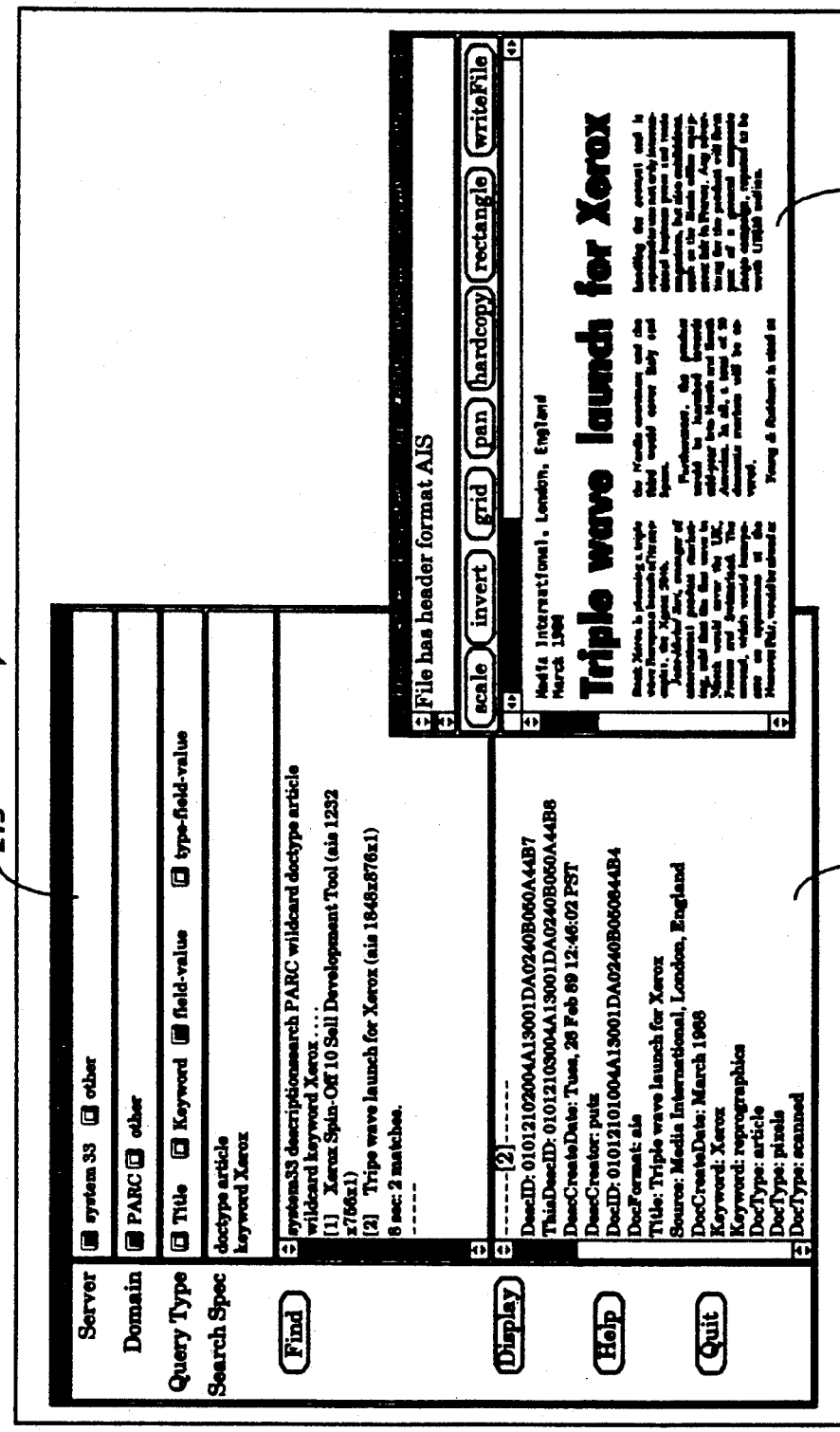
FIG. 11 illustrates a user interface tool for searching document descriptions and for displaying and browsing such descriptions and their corresponding appearances in accordance with this invention.

FIG. 11, in turn, shows another user interface 211 that is based on the Sun Unix "suntools" environment for enabling Sun workstation users to (a) enter search queries into the database system of this invention and display the search results in the upper part 212 of a split window 213, (b) browse the query matching descriptions in the lower part 214 of the window 213, and (c) display the corresponding document appearances in another window 215.

Figure 12:
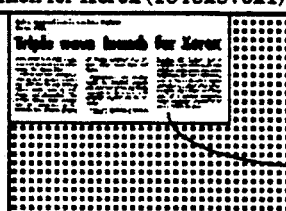
FIG. 12 illustrates another user interface tool for searching, displaying and browsing document descriptions and for displaying and browsing document appearances at different magnifications and resolutions.

FIG. 12 is similar to FIG. 11, except that the user interface 221 operates in the Smalltalk-80 environment and has the additional feature of giving the user an opportunity to preview reduced resolution/reduced size representations of appearances, as at 222, such as for determining whether they are sufficiently interesting to display (i.e., render) at full resolution and size.

CONCLUSION

In view of the foregoing, it will be understood that the present invention enables computer users to interchange and share electronic documents at the human perceptual level (i.e., appearance level), even if the users reside in computing environments that utilize different document encoding formats. All necessary format conversions are carried out for the user client applications, without burdening their local computational resources and without requiring a priori knowledge on the part of the client applications with respect to the encoding formats of the documents the users want to render. Moreover, the renderings that are provided are generally faithful to the original appearance of the documents that are being rendered, thereby essentially preserving the psychophysically significant information content of the originals.

It also will be appreciated that the remote procedure call protocol that has been provided to carry out the present invention enables clients to obtain partial results of the remote procedures they invoke quickly, without requiring the client to wait for the completion of such processes. The running-server-estimates that are returned to the clients with the results of their remote procedure calls enable the clients to optimize their participation with the remote procedures they invoke based on the level of participation that best satisfies their individual requirements.

What is claimed:

1. A database system for servicing client applications residing on computers having diverse hardware configurations and diverse software operating environments, said client applications being interfaced with said database systems via a distributed network, with different ones of said computers utilizing respective ones of a plurality of different encoding formats for reading and writing fully formatted electronic documents of arbitrary content; said database system comprising an appearance database for accumulating and persistently storing electronic documents written in any of said encoding formats upon request of any of said client applications;

rendering means coupled to said database for accessing any of the electronic documents stored therein upon request of any of said client applications, said rendering means including means for converting the encoding formats of at least some of the documents stored in said database into other encoding formats for client applications residing on computers utilizing said other encoding formats, thereby providing psychophysically equivalent renderings of such documents for retrieval by the computers utilizing said other encoding formats.

2. The database system of claim 1 further including means for assigning a unique identification handle and file location to each of said electronic documents as they are entered into said database, means for creating textual descriptions for the documents stored in said database, said descriptions including textual encodings of the handles and file locations of the documents to which they pertain, and a description database for accumulating and persistently storing said descriptions.

3. The database system of claim 2 further including means for searching said descriptions for matches to search queries entered by said client applications, and means for returning the number of matches that are found for each search query to the client application making the query, together with the identification handle and the file location for each query matching description if requested by the client application.

4. The database system of claim 1 wherein said client applications are interfaced with said database system by a remote procedure call interface, thereby enabling the client applications to invoke database operations by making remote procedure calls in accordance with a predetermined remote procedure protocol.

5. The database system of claim 4 wherein said remote procedure protocol comprises a first procedure call for initiating a specified one of a plurality of database operations and for returning at least partial results of it to the client application making the call; a second procedure call, which may be repeated as required, for status checking the specified operation and for returning additional results of it when available; and a third procedure call for terminating the database operation and releasing memory resources allocated to it.

6. The database system of claim 5 further including a main server program from which all of said database operations are forked as child processes in response to arguments specifying said operations.

* * * * *